United States Patent [19]

Choi

[11] Patent Number: 5,473,592
[45] Date of Patent: Dec. 5, 1995

[54] GEAR ASSEMBLY FOR DISK TRANSPORT APPARATUS

[75] Inventor: Young S. Choi, Seoul, Rep. of Korea

[73] Assignee: Daewoo Electronics Co., Ltd., Seoul, Rep. of Korea

[21] Appl. No.: 269,381

[22] Filed: Jun. 30, 1994

[30] Foreign Application Priority Data

Jun. 30, 1993 [KR] Rep. of Korea ............... 93-11884
Jun. 30, 1993 [KR] Rep. of Korea ............... 93-11885

[51] Int. Cl.6 ............................................ G11B 33/02
[52] U.S. Cl. ................................... 369/752; 74/440
[58] Field of Search ................. 369/75.2; 74/440, 74/411, 409

[56] References Cited

U.S. PATENT DOCUMENTS

| | | | |
|---|---|---|---|
| 4,442,516 | 4/1984 | Funabashi | 369/43 |
| 4,739,704 | 4/1988 | Tomita et al. | 74/409 |
| 4,745,823 | 5/1988 | Morita et al. | 74/409 |
| 4,839,881 | 6/1989 | Takahara | 369/75.2 |

Primary Examiner—Stuart S. Levy
Assistant Examiner—Adriana Giordana
Attorney, Agent, or Firm—Nixon & Vanderhye

[57] ABSTRACT

A gear assembly wherein a rotation force is bufferredly transferred is provided. The gear assembly includes a first gear having a ring-shaped engagement protruding portion having a discontinuity and a second gear having a ring-shaped engagement recessed groove having a neck corresponding to the discontinuity and corresponding to the ring-shaped engagement protruding portion. A buffer for a stress is provided between the neck and the ring-shaped engagement protruding portion. As the buffer, a panel spring comprised of two confronting panels and a spring provided on both ends of the spring may be used or an semi-circular ended protruding elastic portion may be formed on both upper sidewall portion of the ring-shaped engagement protruding portion. The buffer provides the gears with a slightly mechanical compensation for protecting the gears during the operation of the gear assembly to achieve an accurate gear operation.

11 Claims, 5 Drawing Sheets

GEAR ASSEMBLY FOR DISK TRANSPORT APPARATUS

BACKGROUND OF THE INVENTION

1. Field of the Invention

The present invention relates to a gear assembly for a disk transport apparatus, and more particularly, to a gear assembly for driving a tray of a minidisk (which is a kind of draw type data memory device) in a disk player.

2. Prior Arts

Recently, in computers or audios or image devices, a number of pits are formed on a surface of a disk to record data. A laser beam is projected onto the disk surface with rotating the disk at a high speed in a disk player and light reflected from the disk is optically read out and converted into an electric signal for reproduction of an image and/or sound or other data. In such a disk player, a disk is mounted on a disk tray and then the disk tray is moved so that the disk is located under the head of a disk driving apparatus. An example of such a transporting device for disk is disclosed in U.S. Pat. No. 4,839,881 (issued to Takahara et al.).

The disk tray is supported by cylindrical bearings provided therebelow so that the disk tray may move smoothly along a guide rail. On the side surfaces of the disk tray, a rack having a number of slots formed thereon is provided for transporting the dynamic force to the disk tray so that the disk tray may be moved along the longitudinal direction thereof. The disk tray is operated reciprocatingly in a predetermined distance.

In a general disk driving system, a motor is operated for applying the dynamic force, to the disk tray having a rack on a side thereof so that the disk tray may move reciprocatingly. More particularly, the rotation force of the motor is firstly applied to a moving rack (which is often referred to as an "operation control member") which can be moved reciprocatingly in a short distance so that the moving rack is moved by a predetermined distance. A plurality of gears are engaged between the moving rack and the disk tray rack so that the dynamic force of the motor is transferred to the disk tray.

The gears are constructed in such a manner that the disk tray may be moved by a longer distance corresponding to the short distance of the moving rack. In such a case, in order to amplifyingly transfer the moving distance of the moving rack to the disk tray, a pair of gears (which is often referred to as a "double gear") are used to adjust the relationship of the reciprocating distances of the moving rack and the disk tray. One example of such a double gear is disclosed in U.S. Pat. No. 4,442,516 (issued to Tadashi Funabshi). FIG. 1 is an exploded view of the double gear as described in the above U.S. Patent.

The double gear as shown in FIG. 1, is mounted on a guide rail (not shown) so that a first gear 26 engaged with the rack of the disk tray and a second gear 25 may rotate coaxially and the double gear is supported by a support pin (not shown). First gear 26 has an axial through a hole 31 in the center thereof and confronting arc-shaped engagement holes 32 are formed at diametrically opposite positions. Second gear 25 has an axial through hole 30 in the center thereof and a pair of confronting pins 27 are rigidly fixed on the upper surface.

The diameter ratio (D1:D2) of first gear 25 to second gear 26 is about 2:1, that is, the ratio of numbers of gear teeth is about 2:1.

A moving rack (not shown) is reciprocatingly moved by a rotational force of a motor. The reciprocating movement is transferred to second gear 25 engaged with the moving rack to rotate second gear 25. The rotation of second gear 25 is transferred to first gear 26 by two pins 27 and two engagement holes 32. First gear 26 drives another gear or a disk tray rack engaged with first gear 26 to reciprocatingly move the disk tray. In this way, a disk is transported under a disk driver head or is removed therefrom.

When using a conventional double gear as described above, pins 27 of second gear 25 strike the sidewalls of engagement holes 32 of first gear 26 during the reciprocating movement of the disk tray. Therefore, pins 27 are easily broken due to the impact occurred in the reciprocating movement so that the double gear must be replaced with a new one occasionally. Also, since the rotating force of second gear 25 is directly transferred to first gear 26, an overload is unpreferably applied to the driving motor.

SUMMARY OF THE INVENTION

Therefore, an object of the present invention is to provide a gear assembly comprising a driving gear and a driven gear wherein a rotation force is bufferredly transferred between these gears during the operation to provide the gears with a slightly mechanical compensation for protecting the gears and for achieving an accurate gear operation.

Another object of the present invention is to provide a gear assembly comprising a driving gear and a driven gear which can be easily manufactured and assembled.

To accomplish the above objects of the present invention, a gear assembly of the present invention comprises a first gear having a ring-shaped engagement protruding portion having a discontinuity, a second gear having a ring-shaped engagement recessed groove having a neck corresponding to the discontinuity and corresponding to the ring-shaped engagement protruding portion, and a means for buffering a stress between the neck and the ring-shaped engagement protruding portion.

Briefly, according to the present invention, there is provided a gear assembly for transferring a rotating force from a driving gear to a driven gear, the gear assembly comprising:

a first gear of a first diameter having a ring-shaped engagement recessed groove and a neck portion in a portion of the groove on a lower surface portion;

a second gear of a second diameter smaller than the first diameter having a ring-shaped engagement protruding portion corresponding to the ring-shaped engagement recessed groove and a discontinuity corresponding to the neck portion on an upper surface portion, the second gear being coaxially located under the first gear, and the engagement recessed groove and the neck portion being engaged with the ring-shaped engagement protruding portion and the discontinuity, respectively; and a means for buffering a stress applied to the first and second gears when a rotating force is transferred between the first and second gears, between the neck portion and a sidewall of the ring-shaped engagement protruding portion.

According to one embodiment of the present invention, the buffering means may be a panel spring comprised of a pair of confronting panels and a spring provided between the panels.

According to another embodiment of the present invention, the buffering means may be a buffering portion formed on both upper sidewalls of the ring-shaped engagement protruding portion. For example, the buffering portion may be a semi-circular ended protruding elastic portion extending from the upper sidewall portion of the ring-shaped engagement protruding portion corresponding to the neck portion. The semicircular ended protruding elastic portion includes a hole having a diameter smaller than that of the semi-circular ended protruding elastic portion therein. The buffering portion is preferably comprised of the same material as the ring-shaped engagement protruding portion.

The present invention provides a gear assembly for transferring a rotating force from a driving gear to a driven gear, the gear assembly comprising:

a first gear of a first diameter having a first circular recessed portion formed on a lower portion thereof, a first circular protruding portion formed in the first circular recessed portion, and a second circular protruding portion having a ring-shaped engagement recessed groove having a neck portion therein formed on the first circular protruding portion;

a second gear being coaxially located with the first gear and having approximately half the first diameter, the second gear having a third circular protruding portion and having a diameter larger than that of second circular protruding portion, a ring-shaped engagement protruding portion formed on the third circular protruding portion corresponding to the ring-shaped engagement recessed groove and a discontinuity corresponding to the neck portion; and a pair of panel springs, each panel spring being comprised of a pair of confronting panels and a spring provided between the panels for buffering a stress applied to the first and second gears when a rotating force is transferred between the first and second gears, the panel spring being located between the neck portion and the sidewall of the ring-shaped engagement protruding portion.

Further, the present invention provides a gear assembly for transferring a rotating force from a driving gear to a driven gear, the gear assembly comprising:

a first gear of a first diameter having a first circular recessed portion formed on a lower portion thereof, a first circular protruding portion formed in the first circular recessed portion, and a second circular protruding portion having a ring-shaped engagement recessed groove having a neck portion therein formed on the first circular protruding portion;

a second gear being coaxially located with the first gear and having approximately half the first diameter, the second gear having a third circular protruding portion having a diameter smaller than that of the first circular protruding portion and greater than that of the second circular protruding portion, a ring-shaped engagement protruding portion formed on the third circular protruding portion corresponding to the ring-shaped engagement recessed groove and a discontinuity corresponding to the neck portion; and a pair of semi-circular ended protruding elastic portions for buffering a stress applied to the first and second gears when a rotating force is transferred between the first and second gears, the semi-circular ended protruding portions extending from both upper sidewall portions of the ring-shaped engagement protruding portion opposing the neck portion and the semicircular ended protruding elastic portion including a hole having a diameter smaller than that of the semi-circular ended protruding elastic portion therein.

The gear assembly of the present invention may be advantageously used for driving a minidisk tray.

Between both sidewall portions of ring-shaped engagement protruding portion and the neck portion, stress buffer is provided. This provides the double gear with a fine margin when upper gear receives stopping force or rotation force. Therefore, the stress may be buffered and a driving motor can be protected from an overload.

BRIEF DESCRIPTION OF THE DRAWINGS

The above objects and other advantages of the present invention will become more apparent by describing in detail a preferred embodiment thereof with reference to the attached drawings in which.

DESCRIPTION OF THE PREFERRED EMBODIMENT

The present invention will be explained in more detail with reference to the attached drawings.

Figure 1:
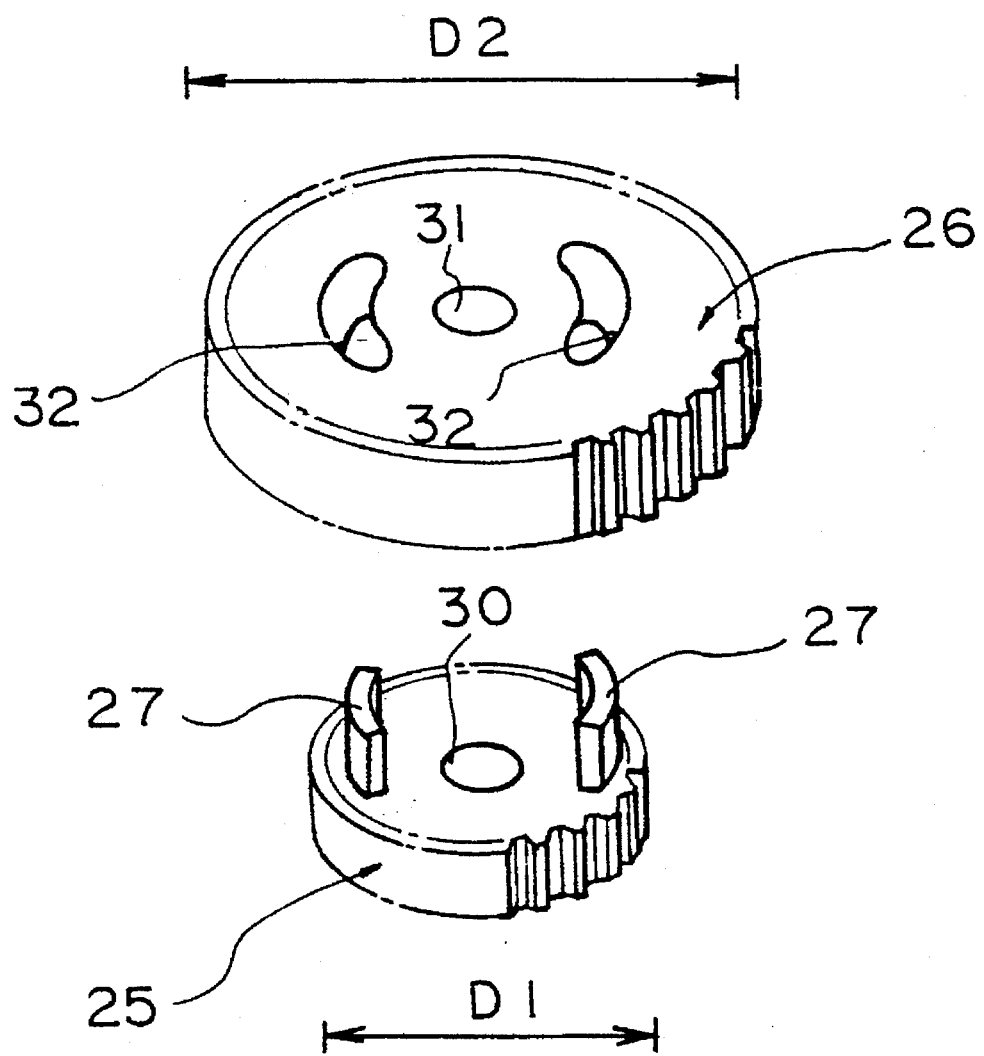
FIG. 1 is an exploded view of a convention double gear.
Figure 2:
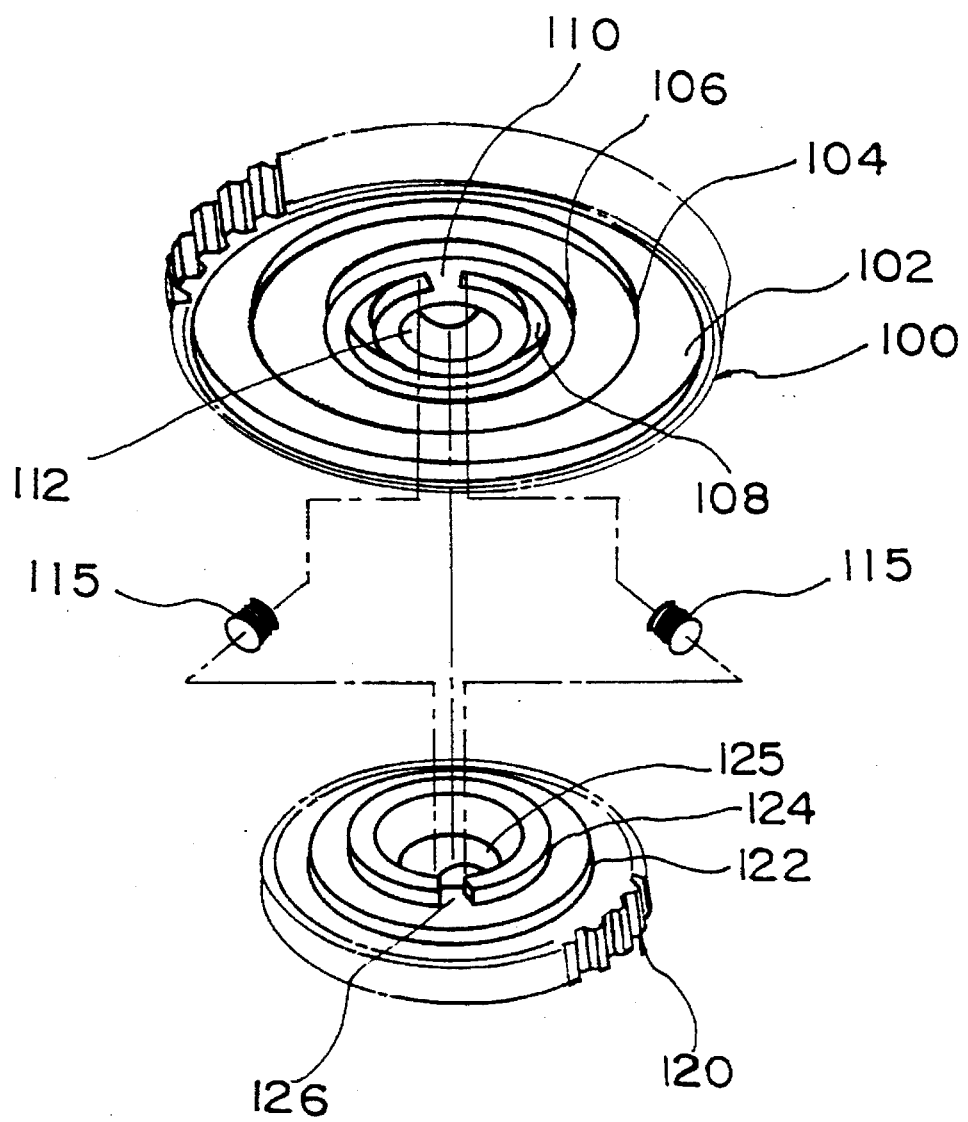
FIG. 2 is a schematic view showing a gear assembly according to one embodiment of the present invention.

FIG. 2 is a schematic view showing a gear assembly according to one embodiment of the present invention. In the same figure, reference numeral 100 denotes an upper gear, reference numeral 102 denotes a first circular recessed portion formed on the lower surface portion of upper gear 100, reference numeral 104 denotes a first circular protruding portion formed in first circular recessed portion 102, reference numeral 106 denotes a second circular protruding portion formed on first circular protruding portion 104, reference numeral 108 denotes a ring-shaped engagement recessed groove, reference numeral 110 denotes a neck portion formed by connecting an outerwall portion of ring-shaped engagement recessed groove 108 with an innerwall portion of ring-shaped engagement recessed groove 108, reference numeral 112 denotes a central through hole of upper gear 100 which a supporting axe passes through, reference numeral 115 denotes a panel spring, reference numeral 120 denotes a lower gear, reference numeral 122 denotes a third circular protruding portion formed on an upper surface portion of lower gear 120, reference numeral 124 denotes a ring-shaped engagement protruding portion (corresponding to the ring-shaped engagement recessed groove) formed on third circular protruding portion 122, reference numeral 125 denote a central axial through hole of lower gear 120 and reference numeral 126 denotes a discontinuity of ring-shaped engagement protruding portion 124 corresponding to neck portion 110.

In the double gear as shown in FIG. 2, ring-shaped engagement recessed groove 108 and neck portion 110 are formed on the lower surface portion of upper gear as a first gear (driven gear) and ring-shaped engagement protruding portion 124 having discontinuity 126 is formed on the upper surface portion of lower gear 120 as a second gear (driving gear).

Discontinuity 126 corresponds to neck portion 110 of upper gear 100 and has a width slightly greater than that of neck portion 110. Here, the width of neck portion 110 is defined as an angle between the lines drawn from the center line of the gear assembly to both side surfaces of neck portion 110 and the width of discontinuity 126 is defined as an angle between the lines drawn from the center line of the gear assembly to both sidewall surfaces of discontinuity 126. Upper gear 100 is mounted on lower gear 120 so that ring-shaped engagement protruding portion 124 is engaged with ring-shaped engagement recessed groove 108.

More particularly, on the lower surface portion of upper gear 100, first circular recessed portion 102 having a diameter greater than that of lower gear 120 is formed and first circular protruding portion 104 having almost the same diameter as that of lower gear 120 is formed in first circular recessed portion 102. On first circular protruding portion 104, second circular protruding portion 106 having a ring-shaped engagement recessed groove 108 having a neck portion 110 therein and having a diameter smaller than that of first circular protruding portion 104 is formed. Third circular protruding portion 122 having a diameter smaller than that of lower gear 120 is formed on the upper surface of lower gear 120 and ring-shaped engagement protruding portion 124 is formed on third circular protruding portion 122. Ring-shaped engagement protruding portion 124 has almost the same width as that of ring-shaped engagement recessed groove 108 and has a height almost equal to a depth of ring-shaped engagement recessed groove 108. These first, second and third circular protruding portions 104, 106 and 122 improve the engagement between ring-shaped engagement recessed groove 108 and ring-shaped engagement protruding portion 124. Also, first circular recessed portion 102 reduces a gap between the upper and lower gears.

Due to the presence of neck portion 110 of upper gear 100 and ring-shaped engagement protruding portion 124 of lower gear 120, a rotation force of lower gear 120 is transferred to upper gear 100. These upper and lower gears 100 and 120 are conventionally manufactured with engineering plastic; which is well known to any one skilled in the pertinent art.

Figure 3:
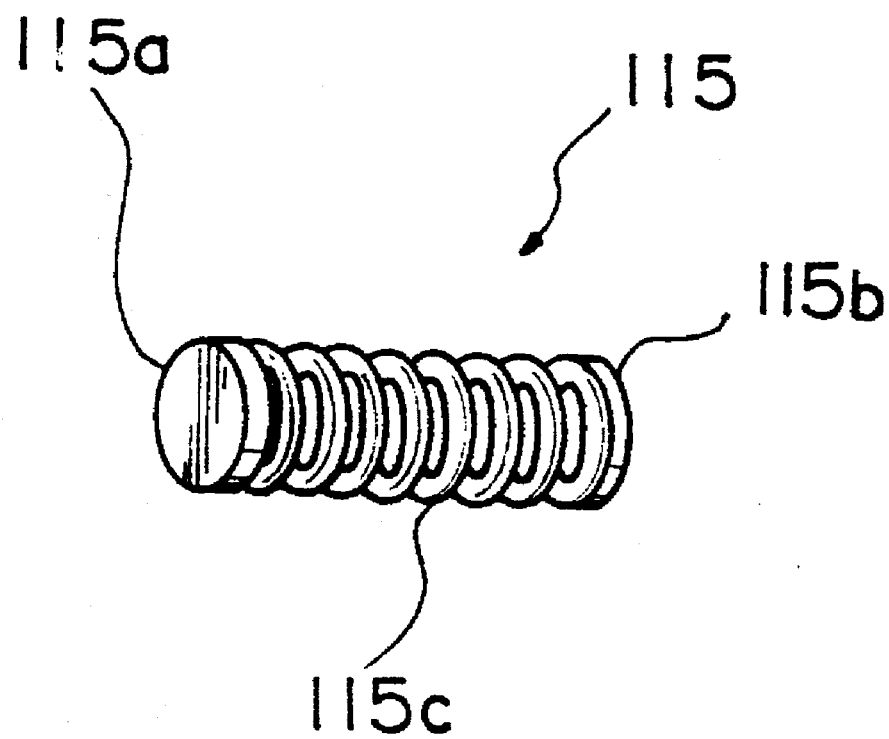
FIG. 3 is a schematic view for illustrating a panel spring according to one embodiment of the present invention.

In the present embodiment, a pair of cylindrical panel springs 115 are provided between both side surfaces of ring-shaped engagement protruding portion 124 and both side surfaces of neck portion 100. FIG. 3 is a schematic view for illustrating a panel spring 115 according to one embodiment of the present invention. As shown in FIG. 3, panel spring 115 includes a pair of disks (or circular panels) 115a and 115b having the same diameter and a spring 115c having a diameter same as that of disks 115a and 115b between the two disks 115a and 115b. The diameter of panel spring 115 which is defined as a diameter of disks 115a and 115b or spring 115c is to be determined in consideration of an assembling work for the double gear and treatment thereabout. Panel spring 115 preferably has such a diameter that the circle of the disks inscribes a rectangle of a sidewall of neck portion 110 or ring-shaped engagement protruding portion 124.

When assembling a double gear as shown in FIG. 2, after attaching a pair of panel springs 115 on the sidewalls of neck portion 110 or on the sidewalls of ring-shaped engagement protruding portion 124 using an adhesive, upper gear 100 is mounted on lower gear 120 so that ring-shaped engagement protruding portion 124 engages with ring-shaped engagement recessed groove 108.

Figure 4:
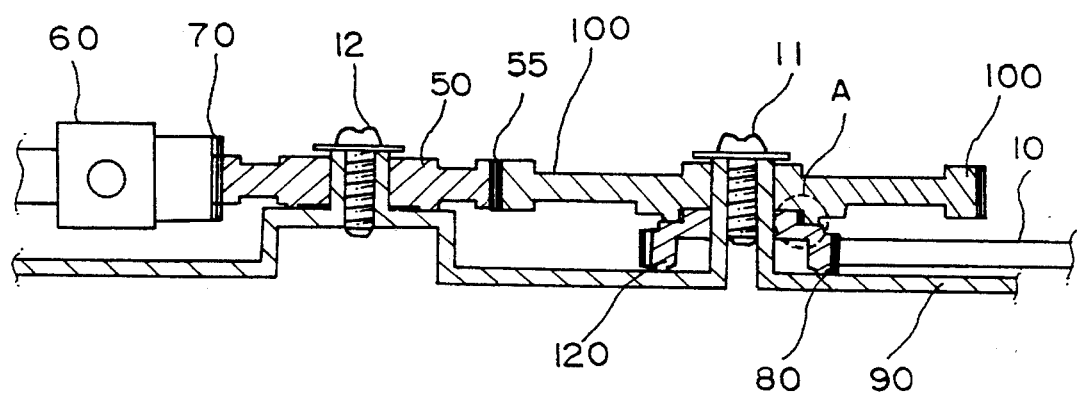
FIG. 4 is a sectional view for illustrating a disk tray driving system wherein a double gear according to one embodiment of the present invention is applied.
Figure 5:
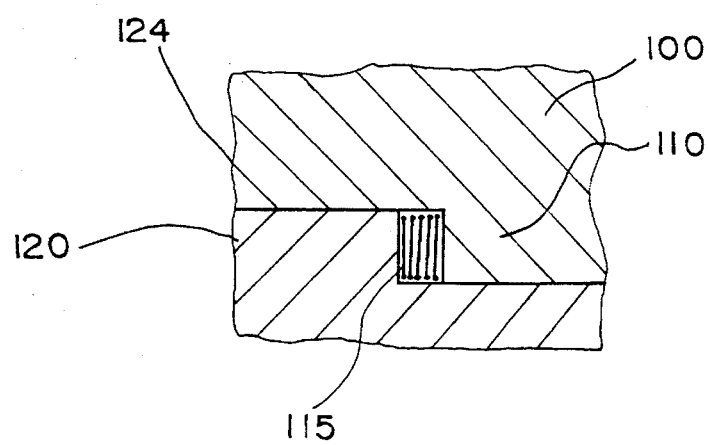
FIG. 5 is an enlarged view of portion A in FIG. 4.

FIG. 4 is a sectional view for illustrating a disk tray driving system wherein a double gear according to one embodiment of the present invention is applied. In the same figure, reference numeral 10 denotes a moving rack, reference numeral 11 denotes a first screw, reference numeral 12 denotes a second screw, reference numeral 50 denotes a transporting gear, reference numeral 55 denotes an gear teeth engagement portion between transporting gear 50 and upper gear 100, reference numeral 60 denotes a disk tray, reference numeral 70 denotes a tray rack, reference numeral 80 denotes a gear teeth engagement portion between moving rack 80 and lower gear 120 and reference 90 denotes a supporting member. FIG. 5 is an enlarged view of portion A in FIG. 4.

Referring to FIG. 4, moving rack 10 is reciprocatingly operated within a short distance by means of a motor (not shown). Upper gear 100 and lower gear 120 are coaxially and rotatably fixed on supporting member 90 by first screw 11 so that ring-shaped engagement protruding portion 124 engages with ring-shaped engagement recessed groove 108. The reciprocating movement of moving rack 10 is transferred to lower gear 120 via gear teeth engagement portion 80 so that lower gear 120 may rotate. The rotation movement of lower gear 120 is transferred to upper gear 120 via ring-shaped engagement protruding portion 124 of lower gear 120 and neck portion 110 of upper gear 100 to rotate upper gear 100. The rotation movement of upper gear 100 is transferred to tray rack 70 via transporting gear 50 which is rotatably fixed on another portion of supporting member 90 so that disk tray 60 may move reciprocatingly.

In the gear assembly according to one embodiment of the present invention, a pair of panel springs 115 are provided on both sidewall portions of ring-shaped engagement protruding portion 124. Panel spring 115 provides the double gear (that is, gear assembly) with a margin when upper gear 100 receives stopping force during the rotation of the double gear or rotation force when the double gear stops. Panel spring 115 buffers these forces to protect the double gear from a stress applied thereto. Buffering also prevents a motor driving the moving rack from overloading to lengthen the duration of the motor.

Further, when manufacturing a double gear, a space margin is improved against the precision of a stopper and therefore assembling work can be easily performed. The gap occurred in the teeth engagement portion is removed to give a compensation so that normal engagement of the double gear may be achieved. This compensates a fine movement to facilitate a normal operation of the double gear.

Figure 6:
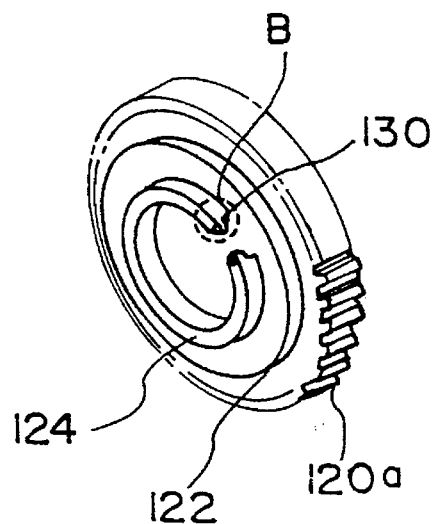
FIG. 6 is a perspective view of a lower gear according to a second embodiment of the present invention.

FIG. 6 is a perspective view of a lower gear 120a according to a second embodiment of the present invention. In the present embodiment, a gear same as upper gear 100 in the first embodiment is used as an upper gear.

Lower gear 120a of the present embodiment is the same as lower gear 120 of the first embodiment except that a buffering portion 130 is formed on an upper sidewall portion of ring-shaped engagement protruding portion 124 of lower gear 120a instead of panel spring 115 of the first embodiment. That is, while in the first embodiment a panel spring is used for buffering the stress applied to a double gear, buffering portion 130 is formed on the upper sidewall portion of ring-shaped engagement protruding portion 124 in the present embodiment.

Figure 7:
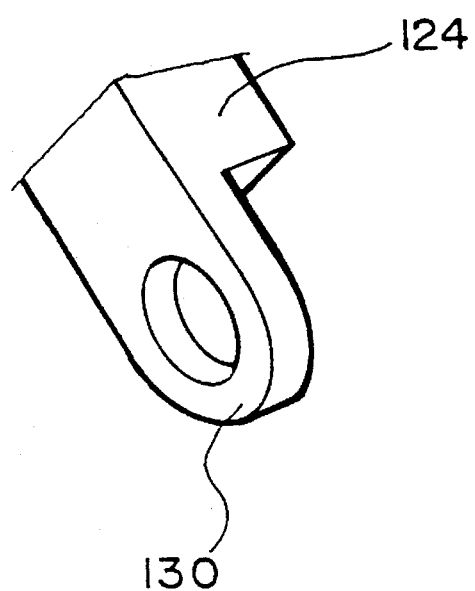
FIG. 7 is an enlarged view of portion B of FIG. 6 including a buffering portion.

FIG. 7 is an enlarged view of portion B of FIG. 6 including a buffering portion 130. As shown in the same figure, buffering portion 130 is protrudingly formed by extending from an upper sidewall portion of ring-shaped engagement protruding portion 124 to neck portion 110 in a semi-circle ended shape. A hole whose diameter is a little bit smaller than that of the semicircle of the end portion of buffering portion 130 is formed at the center portion thereof. Buffering portion 130 is preferably comprised of the same material as that of ring-shaped engagement protruding portion 124. When manufacturing lower gear 120a using a plastic material, a mold having a shape for producing the above shape is used. Alternatively, after manufacturing a gear having the same shape of lower gear 120 as in the first embodiment and buffering portion 130 separately, buffering portion 130 may be attached to the upper sidewall portion of ring-shaped engagement protruding portion 124 of lower gear 120 using an adhesive. Here, buffering portion 130 may be manufactured using an elastic material such a natural or synthetic rubber.

Since a plastic material has an elasticity, a semi-circle ended protruding portion as above having a hole therein may be used for buffering the stress. Only one big hole may be formed. However, a plurality of small holes may be formed instead of the big hole.

The operation of the double gear of the present embodiment is the same as explained in the first embodiment, and therefore, its operation will be omitted.

In the first embodiment, manufacturing a panel spring and its handing are difficult. However, in this embodiment, since the buffering portion is directly attached to the lower gear, the buffering portion and lower gear may be manufactured simultaneously by a molding process.

As explained above, between both sidewall portions of ring-shaped engagement protruding portion 124 and neck portion 110, a stress buffer is provided. This provides the double gear with a fine margin when upper gear receives stopping force or rotating force when the upper gear engages with other gear or tray rack, to buffer a stress. Thus, the double gear is protected from the stress and the driving motor is protected from an overload.

Further, a space margin is improved against the precision of a stopper when manufacturing a double gear, and assembling work can be easily performed. Additionally, a gap occurred in the teeth engagement portion is removed to give a compensation so that normal engagement of the double gear may be achieved.

In the embodiments of the present invention, the double gear is used for driving a disk tray. However, the double gear may be used in other mechanical fields.

It is understood by those skilled in the art that the foregoing description is a preferred embodiment of the disclosed gear assembly and that various changes and modifications may be made in the invention without departing from the spirit and scope thereof.

What is claimed is:

1. A gear assembly for transferring a rotation force from a driving gear to a driven gear, said gear assembly comprising:

a first gear as said driven gear of a first diameter having a ring-shaped engagement recessed groove and a neck portion in a portion of said groove formed on a lower surface thereof, and said first gear engaged with a transporting gear engaged with a disk tray rack so that rotation force is transferred to a disk tray to move the disk tray reciprocatingly;

a second gear as said driving gear of a second diameter less than said first diameter having a ring-shaped engagement protruding portion formed on an upper surface thereof, said ring-shaped engagement protruding portion corresponding to said ring-shaped engagement recessed groove, said ring-shaped engagement protruding portion having a discontinuity corresponding to said neck portion, said second gear being coaxially located under said first gear, said engagement recessed groove and said neck portion being engaged with said ring-shaped engagement protruding portion and said discontinuity, respectively, and said second gear engaged with a moving rack of a disk player which is reciprocatingly operated within a predetermined distance by means of a motor; and a means for buffering a stress applied to said first and second gears when a rotation force is transferred between said first and second gears, said buffering means being located between said neck portion and a sidewall of said ring-shaped engagement protruding portion, whereby the gear assembly is provided with a stress margin when said first gear receives stopping and rotation forces so that the gear assembly is protected from the stress and the motor is protected from an overload.

2. The gear assembly as claimed in claim 1, wherein said buffering means is a panel spring comprised of two confronting panels and a spring provided between the panels.

3. The gear assembly as claimed in claim 1, wherein said buffering means is a buffering portion formed on both upper sidewall portions of said ring-shaped engagement protruding portion.

4. The gear assembly as claimed in claim 3, wherein said buffering portion is a semicircular ended protruding elastic portion extending from an upper sidewall portion of said ring-shaped engagement protruding portion to said neck portion, said semicircular ended protruding portion including a hole having a diameter smaller than that of said semi-circular ended protruding elastic portion therein.

5. The gear assembly as claimed in claim 3, wherein said buffering portion is comprised of the same material as said ring-shaped engagement protruding portion.

6. The gear assembly as claimed in claim 1, wherein the first diameter is approximately twice the second diameter.

7. The gear assembly as claimed in claim 1, wherein said first gear further comprises a first circular recessed portion having a diameter greater than the second diameter formed on a lower portion of said first gear, a first circular protruding portion having a diameter approximately the same as that of said lower gear formed in said first circular recessed portion, and a second circular protruding portion having said ring-shaped engagement recessed groove having said neck portion therein on said first circular protruding portion.

8. The gear assembly as claimed in claim 1, wherein said second gear further comprises a third circular protruding portion having a diameter smaller than second diameter formed on an upper surface of said second gear and said ring-shaped engagement protruding portion is formed on said third circular protruding portion.

9. The gear assembly as claimed in claim 1, wherein said gear assembly is used for driving a disk tray of a minidisk.

10. A gear assembly for transferring a rotating force from a driving gear to a driven gear, said gear assembly comprising:

a first gear as said driven gear of a first diameter having a first circular recessed portion formed on a lower portion thereof, a first circular protruding portion formed in said first circular recessed portion, and a second circular protruding portion having a ring-shaped engagement recessed groove having a neck portion therein formed on said first circular protruding portion, and said first gear engaged with a transporting gear engaged with a tray rack so that the rotation force is transferred to a disk tray to move the disk tray reciprocatingly;

a second gear as said driving gear coaxially located with said first gear and having a diameter approximately half the first diameter, said second gear having a third circular protruding portion having a diameter smaller than that of said first circular protruding portion and greater than that of second circular protruding portion, a ring-shaped engagement protruding portion formed on said third circular protruding portion corresponding to said ring-shaped engagement recessed groove and a discontinuity corresponding to said neck portion, and said second gear engaged with a moving rack of a disk player which is reciprocatingly operated within a predetermined distance by means of a motor; and a panel spring comprised of a spring and two confronting panels, said panels provided on both ends of said spring, for buffering a stress applied to said first and second gears when a rotation force is transferred between said first and second gears, said panel spring being located between said neck portion and a sidewall of said ring-shaped engagement protruding portion, whereby the gear assembly is provided with a stress margin when said first gear receives stopping and rotation forces so that the gear assembly is protected from the stress and the motor is protected from an overload.

11. A gear assembly for transferring a rotation force from a driving gear to a driven gear, said gear assembly comprising:

a first gear as said driven gear of a first diameter having a first circular recessed portion formed on a lower portion thereof, a first circular protruding portion formed in said first circular recessed portion, and a second circular protruding portion having a ring-shaped engagement recessed groove having a neck portion therein formed on said first circular protruding portion, and said first gear engaged with a transporting gear engaged with a tray rack so that the rotation force is transferred to a disk tray to move the disk tray reciprocatingly a second gear as said driving gear coaxially located with said first gear and having approximately half the first diameter, said second gear having a third circular protruding portion having a diameter smaller than that of said first circular protruding portion and greater than that of second circular protruding portion, a ring-shaped engagement protruding portion formed on said third circular protruding portion corresponding to said ring-shaped engagement recessed groove and a discontinuity corresponding to said neck portion, and said second gear engaged with a moving rack of a disk player which is reciprocatingly operated within a predetermined distance by means of a motor; and a pair of semicircular ended protruding elastic portions for buffering a stress applied to said first and second gears when a rotation force is transferred between said first and second gears, said semicircular ended protruding elastic portions extending from both upper sidewall portions of said ring-shaped engagement protruding portion opposing said neck portion and said semicircular ended protruding elastic portion including a hole having a diameter smaller than that of said semicircular ended protruding elastic portion therein, whereby the gear assembly is provided with a stress margin when said first gear receives stopping and rotation forces so that the gear assembly is protected from the stress and the motor is protected from an overload.

\* \* \* \* \*